United States Patent [19]
Langenhorst

[11] Patent Number: 5,433,054
[45] Date of Patent: Jul. 18, 1995

[54] FRAME STRUCTURES, ESPECIALLY FOR INSPECTION AND ACCESS OPENINGS IN WALLS, ROOFS AND CEILINGS

[75] Inventor: Christoph Langenhorst, Soest, Germany

[73] Assignee: Eva Langenhorst nee Lahrmann, Soest, Germany

[21] Appl. No.: 163,083

[22] Filed: Dec. 7, 1993

[30] Foreign Application Priority Data

Jan. 9, 1993 [DE] Germany .................. 43 00 436.9

[51] Int. Cl.⁶ ........................................ E04C 2/38
[52] U.S. Cl. ........................... 52/656.9; 52/656.1; 52/656.2; 403/402
[58] Field of Search .......... 52/656.9, 656.1, 656.2; 403/401, 402, 403, 205

[56] References Cited

U.S. PATENT DOCUMENTS

| | | | |
|---|---|---|---|
| 3,627,359 | 12/1971 | Paul | 52/656.9 X |
| 3,673,674 | 7/1972 | Catalle | 403/401 X |
| 3,709,533 | 1/1973 | Walters | 52/656.9 X |
| 3,797,194 | 3/1974 | Ekstein | 52/656.9 X |

FOREIGN PATENT DOCUMENTS

| | | | |
|---|---|---|---|
| 2515924 | 10/1976 | Germany | 52/656.9 |
| 2041057 | 9/1980 | United Kingdom | 52/656.9 |
| 2085108 | 4/1982 | United Kingdom | 52/656.9 |

Primary Examiner—Carl D. Friedman
Assistant Examiner—Christopher Todd Kent
Attorney, Agent, or Firm—Herbert Dubno

[57] ABSTRACT

An inner frame for a cover and an outer frame for an inspection opening can be formed with frame members having flanges projecting from the plane of the frame and formed with tongues at their ends engageable by resilient hooks of the respective corner elements which fit without play against the frame members. The frame ends are cut at right angles to the longitudinal edges of the frame member in the case of the outer frame and are provided with abutting miters in the case of the inner frame.

15 Claims, 3 Drawing Sheets

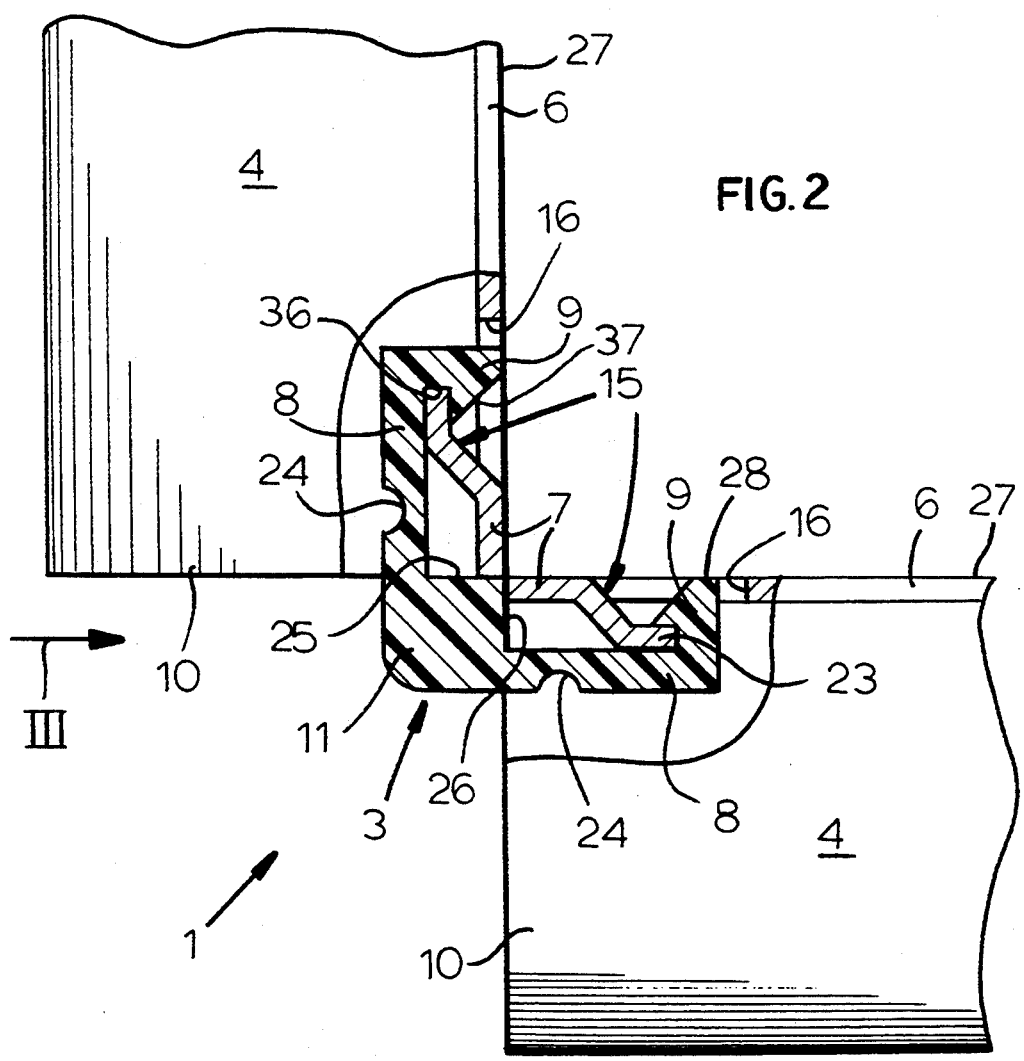
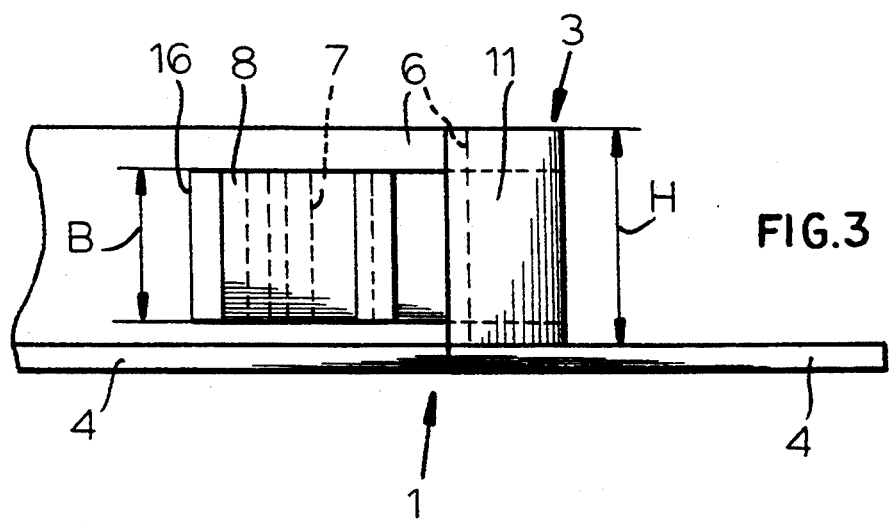

FRAME STRUCTURES, ESPECIALLY FOR INSPECTION AND ACCESS OPENINGS IN WALLS, ROOFS AND CEILINGS

FIELD OF THE INVENTION

The present invention relates to a frame, especially a frame for an inspection or access opening or a frame for a cover of such an opening in a wall, ceiling or roof of a structure.

BACKGROUND OF THE INVENTION

For openings in walls, ceilings and roofs, hereinafter referred to generally as inspection or access openings in walls, it is a common practice to frame out the opening with frame members providing an outer frame and to provide within that opening a cover which can also have a frame along its outer periphery.

These are the types of frames with which the invention is concerned and hence, in the framework of the invention, a cover frame will mean the frame adapted to be received in the inspection opening frame for the cover or closure of that opening.

Inspection and access openings can be provided practically anywhere in a structure to allow something behind that opening to be readily inspected or accessed. The opening may afford access for inspection, maintenance for control purposes to plumbing fixtures or piping, to electrical duct work or even to mechanical systems. The opening may be provided to allow access from below or above to the accessed space. In general the invention is applicable to all openings in a wall which can be provided with a cover which are to be framed out or to receive a frame and which are to be provided in any structure to accommodate an outer frame of a cover.

In inspection opening systems in the past, the frame members for the opening frame and for the cover frame generally were constituted of flat profiles, i.e. members which adjoin at mitered corners, were profiled members, i.e. extrusions or the like of a flat configuration, with a particular cross sectional shape which was selected for the aesthetic or mechanical purposes required. The profile members forming the limbs of the frame were either welded together with one another or rivetted together with the aid of flat corner members engaging in the interiors of the frame members.

The welded connection can result in an offsetting and a loss in precision of the connection of the frame members while the rivetting procedure required time-consuming efforts and additional elements, like the rivets, increasing the cost and complexity of frame assemblies.

In many instances, the method of connection did not permit assembly of the frame prior to installation or, if the frame could be assembled prior to installation, did not allow sufficient versatility for particular frame dimensions and proportions so that a wide variety of prefabricated frames was required to be stocked.

OBJECTS OF THE INVENTION

It is the principal object of the invention to provide an improved frame construction, especially for a so-called inspection opening frame and/or a cover frame for an inspection opening frame which allows the frame members to be connected simply, rapidly and with high dimensional and configurational precision so that stocking of prefabricated frames, frame members of different lengths and their connection elements will be minimized.

Another object of this invention is to provide an improved frame for the purposes described whereby drawbacks of earlier frame systems are avoided.

Still another object of the invention is to provide a low cost highly stable frame structure which is easily and simply assembled and which requires a minimum of parts and a minimum of time for the frame assembly.

SUMMARY OF THE INVENTION

These objects and others which will become apparent hereinafter are attained, in accordance with the invention in a frame structure, especially an inspection frame and/or a cover frame for a cover of an inspection opening, wherein the frame profiles are L-section or L-shaped profiles and the L-shank extending out of the frame plane is formed at each of its end regions with a locking tongue stamped or pressed out of the material of the profile, i.e. formed unitarily therewith. Each two adjoining profiles or frame members at a respective corner are connectable together by a corner angle which has locking claws or hooks engaging behind the respective locking tongues and which are provided at the ends of elastic locking shanks formed unitarily with the respective corner angle.

The invention also provides, independently, where the inspection opening frame is provided with L-shaped shanks lying in the inner periphery of the frame, that the frame members have their ends at right angles to the longitudinal edges of the frame and the inner edges of adjoining frame members abut with their respective L-shanks and the locking tongues project toward the exterior of the L-shanks. Here the corner angles are applied from the exterior of the L-shank and reach around with their hooks to engage the tongues. Each corner angle may have a solid body fitting without play into the corner region between two frame members. As a consequence, the hooks can be flush with the inner faces of the shanks of the profile which project out of the frame plane.

According to another feature of the invention, also of independent significance, the cover frame is formed with its L-shanks which extend out of the frame plane along the exterior of the frame. Here the ends of the frame members are mitered and abut one another, tongues project toward the interior of the frame and the corner angles engage the tongues from the interior of the frame and the solid body of the corner angle fit into cutouts at the corner regions of the frame members without play.

It will be apparent that the invention thus allows those frame members which adjoin without mitering as well as those frame members having mitered ends to be secured exactly at right angles and to fit and be held together perfectly since the precise positioning of the frame members is secured by the fitting of the bodies of the corner angle against the ends of the frame members without play. The locking of the claws or hooks of the corner members around the tongues provides the requisite resilience and joining force. The invention eliminates the need for rivetting or even provision of gaps for thermal expansion and contraction.

The frame members are either provided with mitered ends or squared off ends, depending upon whether they are used as inner or outer frame members and thus the different types of frame members which are to be stored or stocked can be minimized. Furthermore, the frame members can be rapidly, simply and accurately locked together with precision as to the heights, widths and depths of the frame members prior to installation so that the cost of materials and fabrication costs can be reduced.

According to a feature of the invention, the mitered ends of the inner profile members, in the regions of their outer corners, can each be provided with a respective right-angle recess or cutout in which the body portion of the corner member can be received without play. A rectangular cutout in this manner can avoid the development of stresses in the frame during the connection of the members.

The frame members can be composed of steel, nonferrous metal, aluminum or synthetic resin materials and can be rolled, extruded or otherwise fabricated. The formations, like the tongues and cutouts can be stamped with high precision and the ends of the frame members similarly fabricated to minimize the amount of sawing or machining which the frame members require.

In the case of plastics, the tongues can be molded at the time that the frame member is molded if desired.

In all cases, the tongues should be provided with offsets so that a portion of each tongue projects inwardly in the case of the inner frame and outwardly in the case of the outer frame from the plane of the respective shank but parallel thereto.

The corner angles can be composed of steel, other metals like nonferrous metals and aluminum, or plastic. It is important only that the corner member be sufficiently strong to hold the frame members together and to have sufficient elasticity to engage the tongues and retain the dimensional precision of the frame.

The shanks of the corner members carrying the hooks or claws can be substantially of the same width as the tongues and lie at the level thereof. In this manner a highly accurate fit of the frame members together can be provided with the frame members being braced by the corner members. The locking claws or hooks can be flush with the inner or outer surfaces of the flanges of the profile into which they extend.

While the opening frame is secured in the wall which provides greater stiffness or stability to the frame, the cover frame is usually formed with a covering of insulation board or the like for stabilization, the insulation board generally being attached by screws to the cover frame.

More particularly, a frame for an opening in a wall ceiling or roof can comprise:

a multiplicity of elongated L-section members forming limbs of the frame and meeting one another at corners of the frame, the members each having a first flange substantially coplanar with first flanges of the other members and a second flange projecting out of a plane of the first flanges;

a respective resilient locking tongue formed in the second flange of each member at each end thereof; and a respective corner element at each of the corners and having angularly adjoining resilient shanks formed with hooks, each of the hooks engaging a respective one of the tongues of second flanges of the members meeting at the respective corners and locking the members together.

Preferably the second flanges are oriented along an interior of the frame, the members have ends lying at right angles to the flanges, the second flanges adjoin at the corners at inner edges and the tongues are bent out of the respective second flanges outwardly, the corner elements being located outwardly of the second flanges and having solid body portions with flanks adjoining at a right angle tightly fitting against the ends of the members at the respective corners.

Alternatively the second flanges are oriented along an exterior of the frame, the members have mitered ends lying at angles to the flanges, the second flanges adjoin at the corners at outer edges and the tongues are bent out of the respective second flanges inwardly, the corner elements being located between the second flanges and having solid body portions with flanks adjoining at a right angle tightly fitting against the ends of the second flanges at the respective corners.

BRIEF DESCRIPTION OF THE DRAWING

The above and other objects, features and advantages of the invention will become more readily apparent from the following description, reference being made to the accompanying highly diagrammatic drawing in which:

FIG. 2 is a section in the region of a corner of the outer frame;

FIG. 3 is a view of the corner of FIG. 2 in the direction of arrow III of FIG. 2;

SPECIFIC DESCRIPTION

Figure 1:
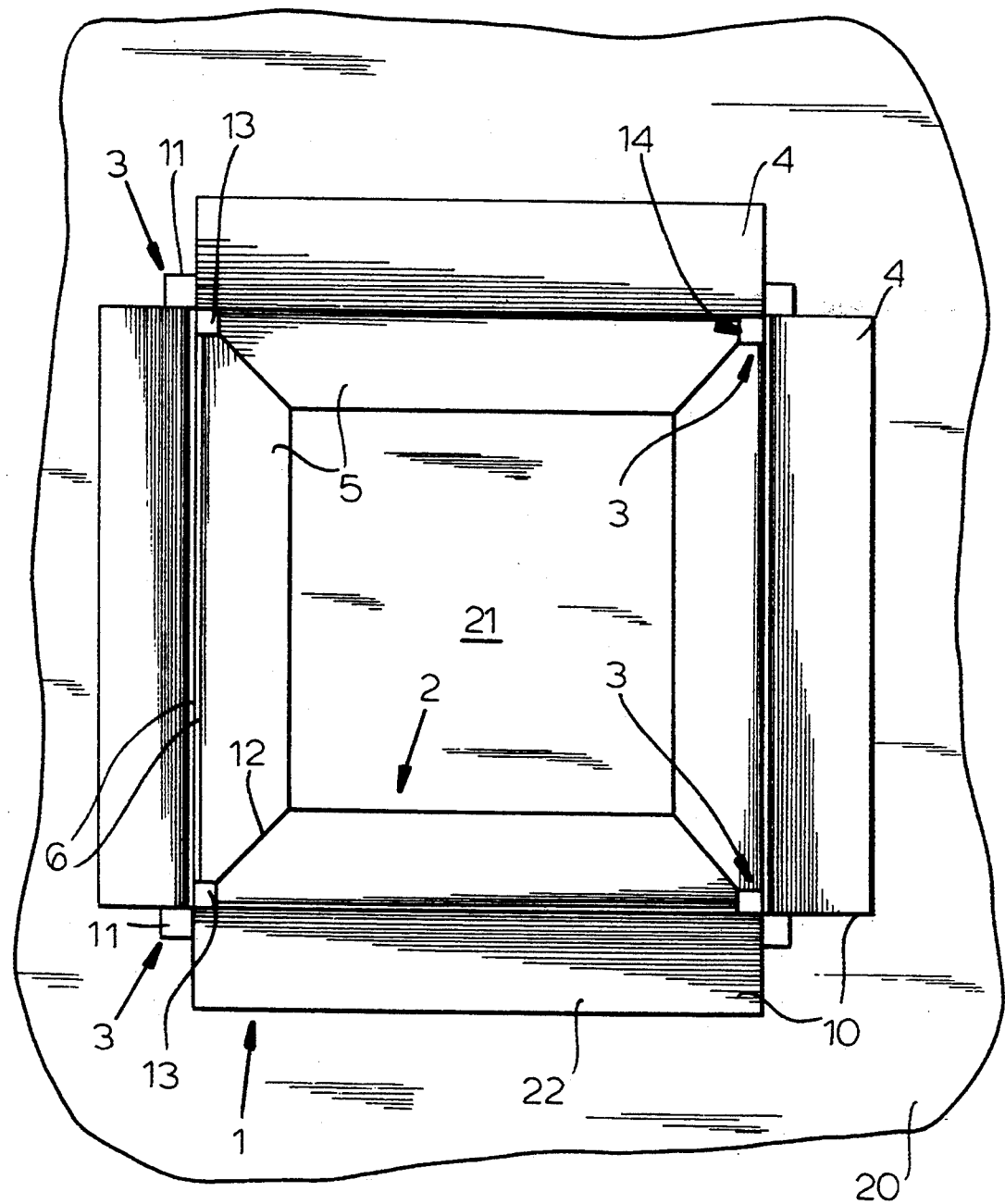
FIG. 1 is an elevational view of an inspection frame and cover frame shown in a wall according to the invention.

In the drawing an inspection frame 1 and a cover frame 2 for an inspection opening adapted to be built into a wall or ceiling have been shown. The ceiling or wall is represented generally at 20 in FIG. 1 while the panel 21 spanning the cover frame can be composed of insulation board or the like attached by screws to the frame 2. The flanges 22 of the outer frame 1 which define the frame plane are shown to be on the inner side of the ceiling or wall and are normally covered by the ceiling or wall board, being attached by screws, e.g. self-dapping screws, thereto.

Figure 4:
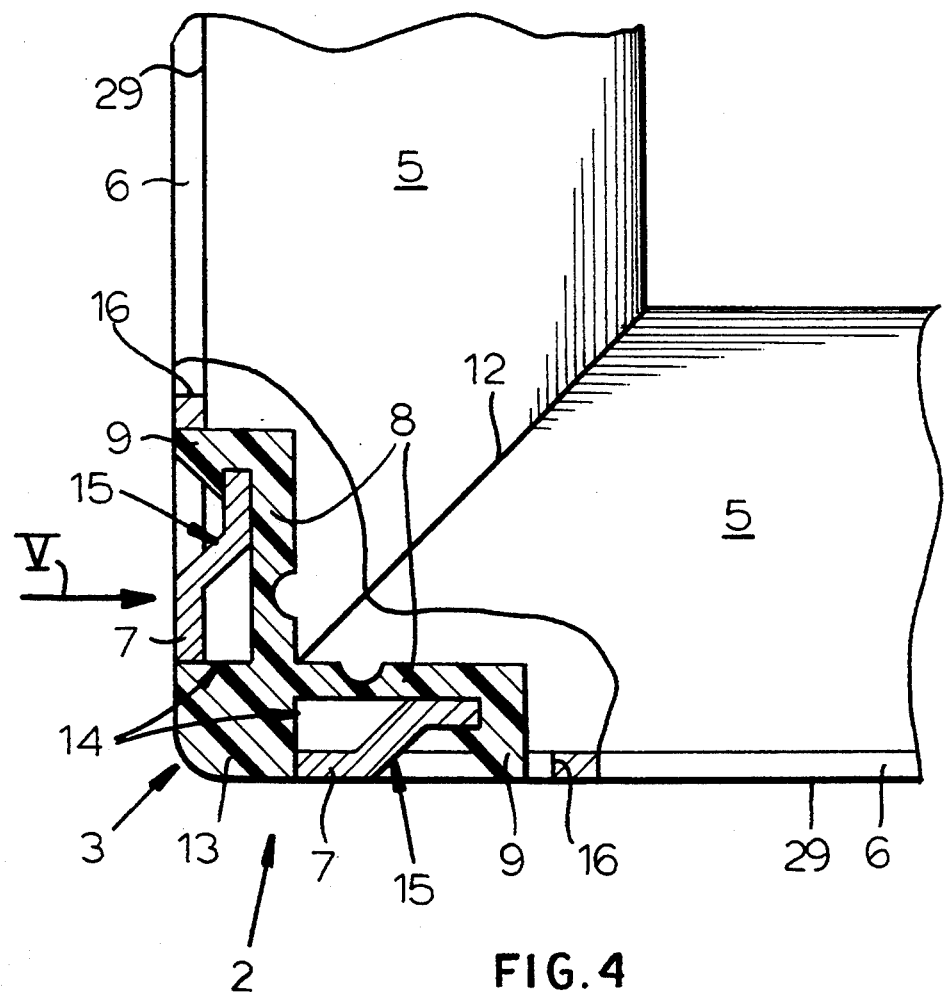
FIG. 4 is a section similar to FIG. 2 but of the inner frame.
Figure 5:
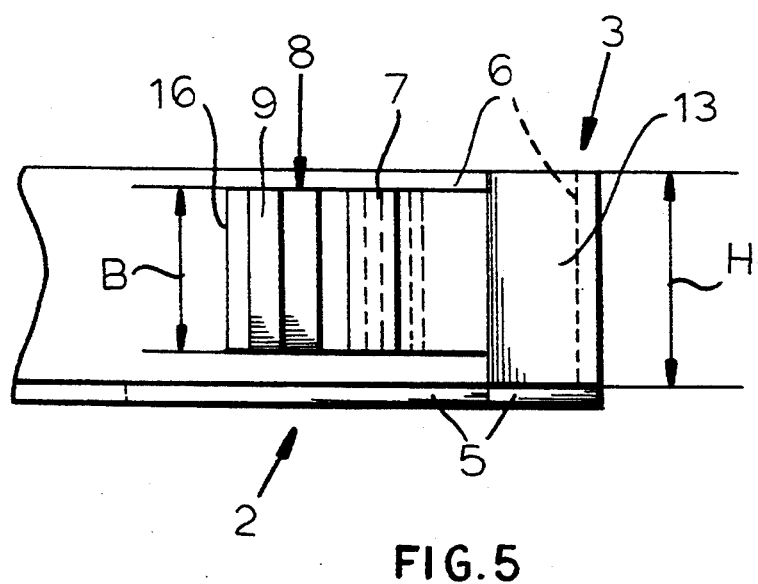
FIG. 5 is a view in the direction of arrow V of FIG. 4.

The frames 1 and 2 are composed of frame members 4 and 5 which are joined together at their corners by corner angles or elements generally represented at 3. The construction of the outer frame 1 has been shown in FIGS. 2 and 3 while the construction of the inner frame 2 is shown in FIGS. 4 and 5.

Each of the frame members 4 or 5 has an L-shank or frame 6 which projects from the plane of the flanges 22 and in the illustration of FIG. 1, out of the plane of the paper. At the end regions, the flanges 6 are formed with locking tongues 7 which are unitary with the end flanges, i.e. formed in one piece therewith and, in particular, stamped from metal frame members or molded on plastic frame members. In each case, the tongue 7 has an offset 15 which spaces the lip 23 of the respective tongue inwardly or outwardly of the respective flange 6 depending upon whether it is part of the inner frame (FIGS. 4 and 5) or the outer frame (FIGS. 2 and 3).

Each of the pairs of angularly adjoining members 4 or 5 are connected by the corner element 3 which has resilient locking shanks 8 at free ends of which locking claws or hooks 9 are provided. The elastic deformability of the shanks 8 can be increased by grooves 24 cut or molded in these shanks slightly beyond the regions at which the shanks project from solid body portions 11 of the respective corner elements which have flanks 25 and 26 adjoining at a right angle to abut the right angle ends of the members 4 or corresponding surfaces formed by recesses in the mitered ends of the members 5.

Each hook 9 has a recess 36 dimensioned to accommodate the thickness of the respective tongue and an inclined flank 37 or bevel designed to deflect the tongue and guide the tongue into the respective recess as the corner element 3 is driven past the tongue into the window 16 from which the tongue is bent or projects. The flanges 6 have inner surfaces (FIG. 2) at 27 with which the hooks 9 are flush at 28 when the corner elements are in position. In FIGS. 4 and 5, the hooks 9 are flush with outer surfaces 29 of the flanges 6.

In the inspection opening frame 1, the frame members or profiles 4 abut one another along the edges of their respective flanges 6 at inner corners. The ends 10 of these frame members are at right angles to the longitudinal edges of the frame members. The tongues 7 project toward the outer side of the flanges 6 and the corner element 3 engages these tongues 7 form the outer side. The shanks 8 of the corner element 3 are at right angles to one another and the solid filling body 11 is of rectangular cross section and can fit between the ends 10 with its flanks 25, 26 engaging these ends with no play.

In the case of the cover frame 2 (FIGS. 1, 4 and 5), the flanges 6 which project from the frame plane abut at the outer side of the frame. The frame ends are provided with miters 12 which abut one another.

The locking tongues 7 project toward the inner sides of the flanges 6 and are engaged at the inner side by the corner elements 3 which are pushed outwardly with their hooks into the respective openings 16. Each of the corner elements 3 of the inner frame has a rectangular filling body 13 which is received in the respective corner regions between the frame members 5 with a tight fit.

In the embodiment illustrated, the frame members 5 which abut at respective miters 12 at each corner, have an outermost corner at their junction formed with a rectangular cutout 14 into which the filling body 13 projects and is received with a tight fit.

In a preferred embodiment, the frame members 4 and 5 are extruded aluminum profiles from which the tongues 7 are stamped and have the offsets 15 so that the lips 23 will lie parallel to the projecting flanges 6.

The corner elements 3 are composed of fire-resistant synthetic resin or plastic.

The shanks 8 have substantially the same width B as the tongues 7. The filling bodies 11 have substantially the same height H as the flanges 6 and thus are flush at their ends with the frame members 4 and 5.

Assembly of the frame is simple since, once the frame members 4 or 5 are positioned as shown, the corner element 3 at each corner need merely be driven into the windows 16 so that the hooks 9 engage past the tongues 7.

I claim:

1. A frame for an opening in a wall, ceiling or roof, comprising:
a multiplicity of elongated L-section members forming limbs of the frame and meeting one another at corners of the frame, said members each having a first flange substantially coplanar with first flanges of the other members and a second flange projecting out of a plane of said first flanges;
a respective resilient locking tongue formed in the second flange of each member at each end thereof; and
a respective corner element at each of said corners and having angularly adjoining resilient shanks formed with hooks, each of the hooks engaging a respective one of said tongues of second flanges of the members meeting at the respective corners and locking said members together, said second flanges being oriented along an interior of the frame, said members have ends lying at right angles to said flanges, said second flanges adjoin at said corners at inner edges and said tongues are bent out of the respective second flanges outwardly, said corner elements being located outwardly of the second flanges and having solid body portions with flanks adjoining at a right angle tightly fitting against the said ends of the members at the respective corners.

2. The frame defined in claim 1 wherein each of said body portions extends a full height of said second flanges.

3. The frame defined in claim 1 wherein said frame members are composed of steel, nonferrous metal, aluminum or plastic.

4. The frame defined in claim 1 herein each of said tongues is formed unitarily from the respective second flange with an offset and a free end spaced from but parallel to the respective second flange.

5. The frame defined in claim 1 wherein each of said corner elements is composed of steel, another metal or a plastic.

6. The frame defined in claim 1 wherein said shanks are substantially of the same width as said tongues.

7. The frame defined in claim 1 wherein said second flanges are provided with windows into which said hooks extend, free ends of said hooks being flush with a respective flank of the respective second flange.

8. A frame for an opening in a wall, ceiling comprising:
a multiplicity of elongated L-section members forming limbs of the frame and meeting one another at corners of the frame, said members each having a first flange substantially coplanar with first flanges of the other members and a second flange projecting out of a plane of said first flanges;
a respective resilient locking tongue formed in the second flange of each member at each end thereof; and
a respective corner element at each of said corners and having angularly adjoining resilient shanks formed with each of the hooks engaging a respective one of said tongues of second flanges of the members meeting at the respective corners and locking said members together, said second flanges being oriented along an exterior of the frame, said members having mitered ends lying at angles to said flanges, said second flanges adjoining at said corners at outer edges and said tongues being bent out of the respective second flanges inwardly, said corner elements being located between the second flanges and having solid body portions with flanks adjoining at a right angle tightly fitting against the ends of the second flanges at the respective corners.

9. The frame defined in claim 8 wherein each of said body portions extends a full height of said second flanges.

10. The frame defined in claim 8 wherein said members define rectangular cutouts at their corners receiving the respective corner elements so that said body portions are flush with external surfaces of said second flanges.

11. The frame defined in claim 8 wherein said frame members are composed of steel, nonferrous metal, aluminum or plastic.

12. The frame defined in claim 8 wherein each of said corner elements is composed of steel, another metal or a plastic.

13. The frame defined in claim 8 wherein said shanks are substantially of the same width as said tongues.

14. The frame defined in claim 8 wherein said second flanges are provided with windows into which said hooks extend, free ends of said hooks being flush with a respective flank of the respective second flange.

15. A frame for an opening in a wall, ceiling or roof, comprising:

a multiplicity of elongated L-section members forming limbs of the frame and meeting one another at corners of the frame, said members each having a first flange substantially coplanar with first flanges of the other members and a flange projecting out of a plane of said first flanges;

a respective resilient lockings tongue formed in the second flange of each member at each end thereof; and a respective corner element at each of said corners and having angularly adjoining resilient shanks formed with each of the hooks engaging a respective one of said tongues of second flanges of the members meeting at the respective corners and locking said members together, each of said tongues being formed unitarily from the respective second flange with an offset and a free end spaced from but parallel to the respective second flange.

* * * * *